United States Patent
Albrecht et al.

(10) Patent No.: US 8,516,307 B2
(45) Date of Patent: Aug. 20, 2013

(54) EXECUTION LAYER DEBUGGER

(75) Inventors: Zoltán Albrecht, Karlsruhe (DE); Roman Möhl, Zwingenberg (DE); Efstratios Tsantilis, Nussloch (DE)

(73) Assignee: SAP AG, Walldorf (DE)

( * ) Notice: Subject to any disclaimer, the term of this patent is extended or adjusted under 35 U.S.C. 154(b) by 388 days.

(21) Appl. No.: 12/870,047

(22) Filed: Aug. 27, 2010

(65) Prior Publication Data

US 2012/0054550 A1 Mar. 1, 2012

(51) Int. Cl.
*G06F 11/00* (2006.01)

(52) U.S. Cl.
USPC ............................................ 714/38.1

(58) Field of Classification Search
USPC ............................................ 714/38.1
See application file for complete search history.

(56) References Cited

U.S. PATENT DOCUMENTS

| | | | | |
|---|---|---|---|---|
| 4,852,047 A | * | 7/1989 | Lavallee et al. | 700/86 |
| 5,361,352 A | * | 11/1994 | Iwasawa et al. | 717/124 |
| 6,587,995 B1 | * | 7/2003 | Duboc et al. | 716/106 |
| 2002/0157086 A1 | * | 10/2002 | Lewis et al. | 717/127 |
| 2003/0033592 A1 | * | 2/2003 | Tsubata et al. | 717/128 |
| 2003/0217354 A1 | * | 11/2003 | Bates et al. | 717/129 |
| 2004/0205702 A1 | * | 10/2004 | Logan et al. | 717/109 |
| 2012/0180030 A1 | * | 7/2012 | Crutchfield et al. | 717/149 |

* cited by examiner

*Primary Examiner* — Yair Leibovich
(74) *Attorney, Agent, or Firm* — Fountainhead Law Group PC

(57) ABSTRACT

In one embodiment, a method includes determining an execution plan of a plurality of blocks in an application. The execution plan defines a structure for execution of blocks in the plurality of blocks. A debugging command is received in a debugger. An active block in the structure defined in the execution plan. A computing device performs a block level action on the active block.

21 Claims, 8 Drawing Sheets

EXECUTION LAYER DEBUGGER

BACKGROUND

Particular embodiments generally relate to a debugging application.

When an error occurs in a software application, a support user can analyze the problem by debugging the source code. A debugger is used by the support user to view the source code of the application and execute it line by line. The debugger helps in viewing parameters of the executed entities in the application, such as class methods or function modules. The debugger also allows the support user to set watch points and break points to halt the application execution at defined steps, which may help the support user in determining what the problem is in the application. This layer that is seen by the support user is considered the coding layer. It is termed the coding layer because the debugger operates on the source code.

A business layer is the layer of the software application that is visible to an end user using the application. The end user may interact with the business layer to have transactions performed. The software application may model business processes using business objects (BOs) with dedicated attributes and behavior. Interaction between business objects model real-life behavior. Transactions may then be performed that operate on a workflow represented by the business objects. The workflow defines different execution orders that may be taken in performing transactions.

The business layer and coding layer are sufficient as long as the business objects and their interactions are modeled specifically for just one business use case. That is, the corresponding code reads like an exact description of the underlying workflows of the business use case except that instead of the workflow, the programming syntax (i.e., the source code) is followed. Accordingly, program execution needs to always follow the same path and pattern. Debugging of this code may be straightforward and can be used according to the above-described debugger.

However, generic software applications used in many cases have different use cases that have an undefined execution order of their business objects. The execution order is determined on an individual basis, i.e., for each transaction and cannot be determined at design time. The determination of the needed execution steps depends on the actions taken by the user. Accordingly, using a debugger that allows the support user to view source code executed line by line may not be efficient when the execution of the application is using different business objects, which means different parts of the source code are being executed. This makes it very hard for a support user to follow the execution in the debugger. It also makes determining which business object is currently being executed by the application very time-consuming and also, in the worst case, wrong assumptions of where the application currently is active may occur. This may lead to wrong interpretations and wrong corrections in debugging the application.

SUMMARY

In one embodiment, a method includes determining an execution plan of a plurality of blocks in an application. The execution plan defines a structure for execution of blocks in the plurality of blocks. A debugging command is received in a debugger. An active block in the structure defined in the execution plan. A computing device performs a block level action on the active block.

In one embodiment, the command includes a step into command, wherein performing the block level action for the step into command includes entering into execution of the active block.

In one embodiment, the command includes a step over command, wherein performing the block level action for the step over command includes: determining any subblocks to the active block in the structure and executing the active block and any subblocks to move to a next block in the structure.

In one embodiment, the command includes a step out command, wherein performing the block level action for the step out command comprises executing the active block to move a next block in the structure.

In one embodiment, the command includes a continue command, wherein performing the block level action for the continue command includes executing the application until a block level break point is reached.

In one embodiment, a computer-readable storage medium contains instructions that, when executed, control a computer system. The computer system is operable to determine an execution plan of a plurality of blocks in the application. The execution plan defines a structure for execution of blocks in the plurality of blocks. A debugging command is received in a debugger. An active block in the structure defined in the execution plan. The computing system performs a block level action on the active block.

In one embodiment, an apparatus includes one or more computer processors and a computer-readable storage medium comprising instructions that, when executed, control a computer system. The computer system is operable to determine an execution plan of a plurality of blocks in the application. The execution plan defines a structure for execution of blocks in the plurality of blocks. A debugging command is received in a debugger. An active block in the structure defined in the execution plan. The computing system performs a block level action on the active block.

The following detailed description and accompanying drawings provide a better understanding of the nature and advantages of the present invention.

DETAILED DESCRIPTION

Described herein are techniques for a debugging application. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
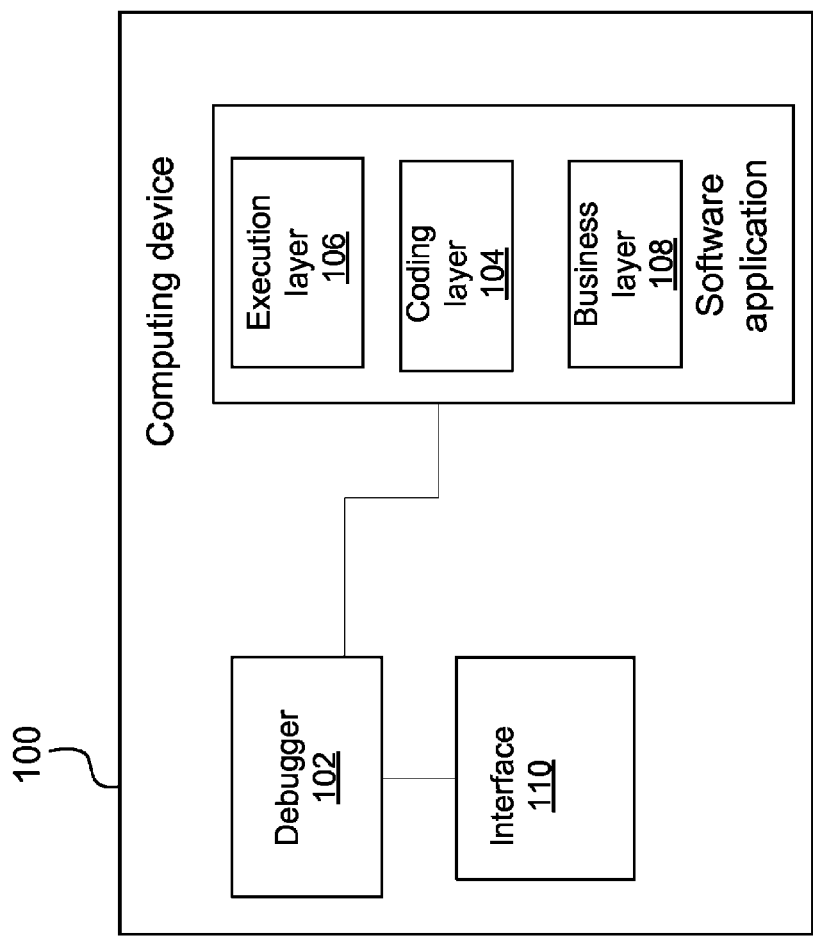
FIG. 1 depicts an example of a debugging system according to one embodiment.

FIG. 1 depicts an example of a debugging system according to one embodiment. A computing device 100 may include a debugger 102. Debugger 102 may be a debugging application that is used to debug a software application. The software application may include different abstraction layers, such as a coding layer 104, an execution layer 106, and a business layer 108.

Business layer 108 may be the layer visible to an end user. For example, a user using the software application interacts with business layer 108.

Coding layer 104 is the layer executing program commands on a line by line basis for the software application. Coding layer 104 may include source code for the software application.

Execution layer 106 may be the layer that defines an execution plan of a specific user input. For example, execution layer 106 may include a plurality of functional blocks where each block may perform a function. In one embodiment, each block may be considered a business object, which includes dedicated attributes and behavior. The execution plan may define an execution order of blocks where the order is characterized in a structure, such as a tree structure or other hierarchical structure. Execution layer 106 will be described in more detail below.

Debugger 102 may interact with execution layer 106 and coding layer 104. For example, debugger 102 displays information from both coding layer 104 and execution layer 106 on an interface 110. A support user can then debug the software application based on the information displayed from execution layer 106 and coding layer 104. As will be described below, debugging tools are provided that interact with execution layer 106. This provides a support user with commands that operate on a block level of execution layer 106 during the debugging process. Accordingly, the support user may debug the application using both execution layer 106 and coding layer 104.

Figure 2:
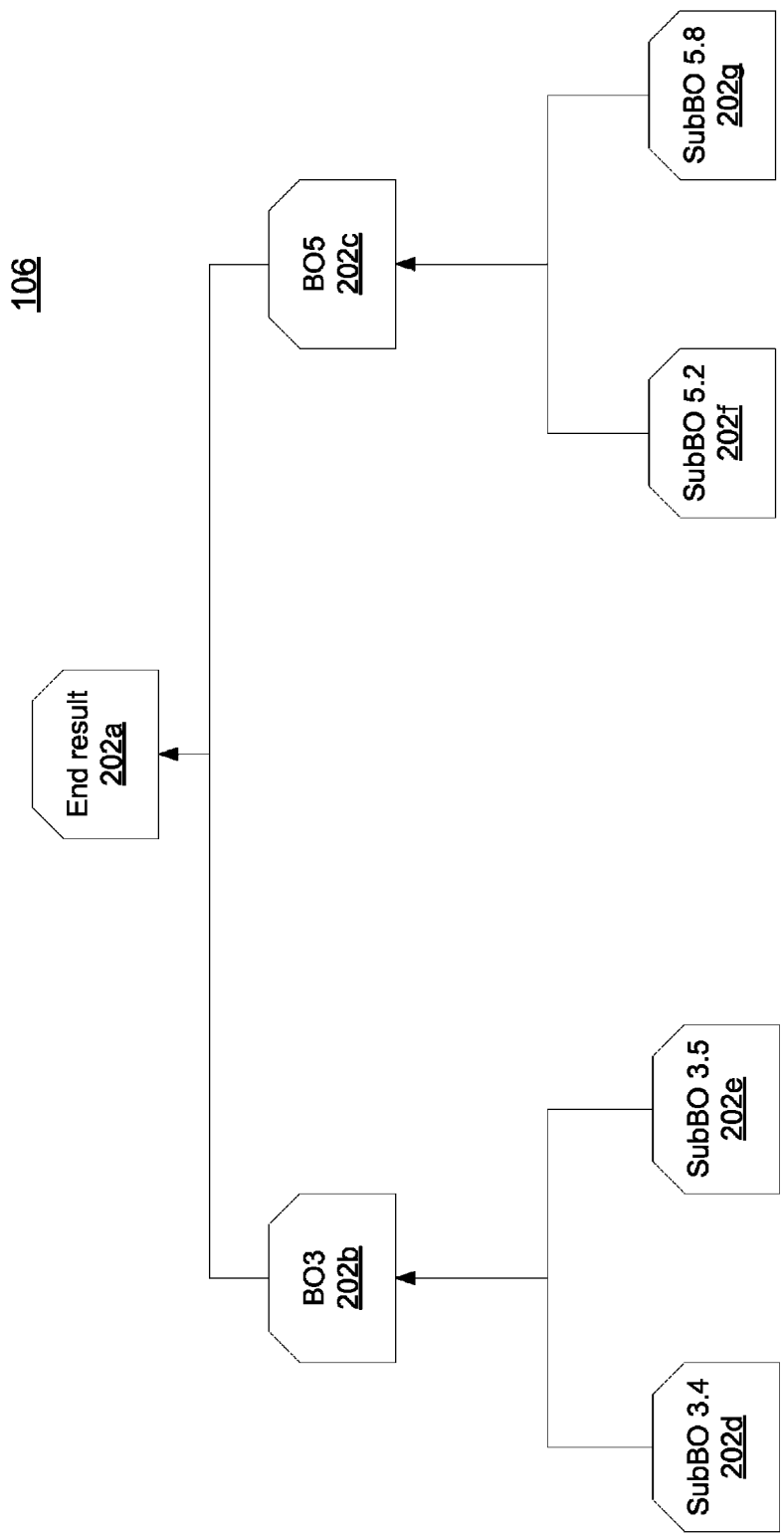
FIG. 2 depicts an example of an execution layer according to one embodiment.

FIG. 2 depicts an example of execution layer 106 according to one embodiment. The execution of the software application is defined by an execution plan of blocks 202. The blocks may be defined for the software application. For example, various blocks are defined and identified in the software application. Each block 202 includes dedicated attributes and behavior.

In one embodiment, blocks 202 may be business objects. Business objects may be implemented as a data structure including methods and/or procedures associated with that data. For example, the business object may include a file or information included in a structured database maintained by a system, such as a sales order form, a telephone directory, an address directory, a customer list, a product list, etc. Also, a business object may refer to another business object, such as a price or a product description, included within the business object.

Each block 202 may include a defined function. For example, each block 202 may be a discrete bundle of functions and procedures that are defined in the software application. A function may be defined using a class, which may be a type of object. The class may include a method, which is a set of procedural statements for achieving a desired result. That is, methods may perform the function of block 202. Whereas a program for the software application may implement classes, which may end up in business objects managing or executing behaviors, a business object differs in that it holds a set of attributes and behaviors, and the business object has associations with other business objects representing business relations.

A calling sequence of blocks 202 may be undetermined at design time. That is, the calling sequence depends on actions performed at run time of the software application. For example, the different transactions performed by the end user of the software application determine the calling sequence. In one example, a transaction may be an operation that is performed using data associated with blocks 202.

The execution plan of the blocks 202 may be defined. For example, the dependencies between blocks 202 are defined in the software application. User input is analyzed and dependencies are resolved. For example, a user wants to calculate C=A/B, where B stands for pieces sold and A for total sales of a product. C thus stands for prize/piece. Before calculating C, A and B are determined. In the execution plan, A and B are sub-nodes of node C. The execution plan may be represented by a structure, such as an execution tree. The tree includes different nodes that are related through relationships, such as business relationships. Different paths may be taken through the execution tree. In one example, a path may include blocks 202f, 202g, 202c, and 202a. In this case, block subBO 5.2 and block subBO 5.8 are needed as inputs to block BO5. Block BO5 then determines the end result using the inputs. Accordingly, only a subset of blocks 202 may be needed for execution.

The difference between execution layer 106 and coding layer 104 is execution layer 106 may execute at a block layer while coding layer 104 executes at a line by line source code basis. In a workflow, a software application may move from block to block to perform various functions. In moving from block to block, lines of code may be executed. Debugger 102 allows debugging at the block level in addition to the line by line source code level.

Each block 202 may provide semantic information to a user. The semantic information shows which block 202 is being executed. The support user can then see the semantic focus of the source code being executed at the block level.

Figure 3:
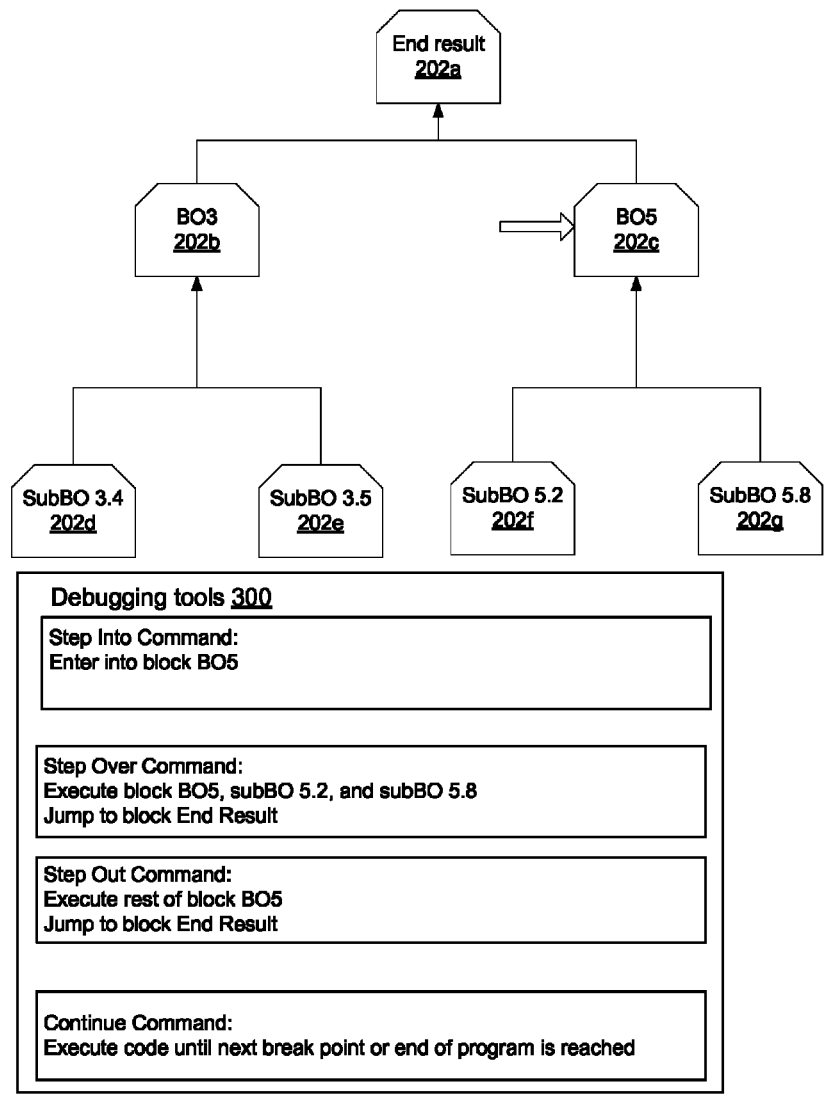
FIG. 3 depicts an example of debugging tools that may be provided by a debugger according to one embodiment.

Debugger 102 provides different debugging tools, such as block level commands, that can be used in debugging the application. FIG. 3 depicts an example of debugging tools 300 that may be provided by debugger 102 according to one embodiment. For example, step into, step over, step out, and continue commands are provided. Additionally, other commands may be appreciated. For example, the execution plan for blocks 202 may be used to determine actions to perform when the debugging tool commands are received during debugging.

The commands are performed with reference to a current active block, which is a current block that is being executed by the application. Instead of operating on a line-by-line basis on the source code, particular embodiments take actions on the block level. The commands may all be executed in one step, which may be in response to receiving one request from the support user to perform the command. For example, entire methods or functions may be executed in one step in response to a command.

The step into command steps into the execution of a block 202. For example, if an active block during the execution of the software application is block 202c (business object BO5), then debugger 102 enters into block 202c. That is, debugger 102 steps into the execution of the underlying block 202c. This goes down one level in an object stack. The object stack may be the current position on the block level in execution layer 106. The levels in the object stack may be the three levels shown in execution layer 106.

A step over command moves to a next block 202 in an execution plan from the active block. For example, if the active block is block 202c, a step over command moves execution to block 202a. In one example, the step over command causes execution of block 202c and jumps to a next executable line for the next block, block 202a. In moving to the next block, execution of any blocks 202 in the sub-tree may be performed. For example, execution of blocks 202f and 202g are performed because for the application to move to the next block, blocks in the sub-tree need to be executed because they provide inputs to the current block 202c. The object stack also stays on the same level because debugger 102 jumps from block 202c to block 202a.

A step out command goes up one level from the object stack. For example, if the current position is inside of block 202c, then the step out command causes debugger 102 to move the current position to the block level. For example, the rest of the block 202c is executed in one step and the level is moved up in the object stack. The execution then moves to the beginning of block 202a.

A continue command continues execution until the next break point or when the end of program is reached. For example, break points may be defined at certain blocks 202. When a block break point is reached, execution of the software program is stopped at that block 202. Thus, the break points are defined at the block level.

Figure 4A:
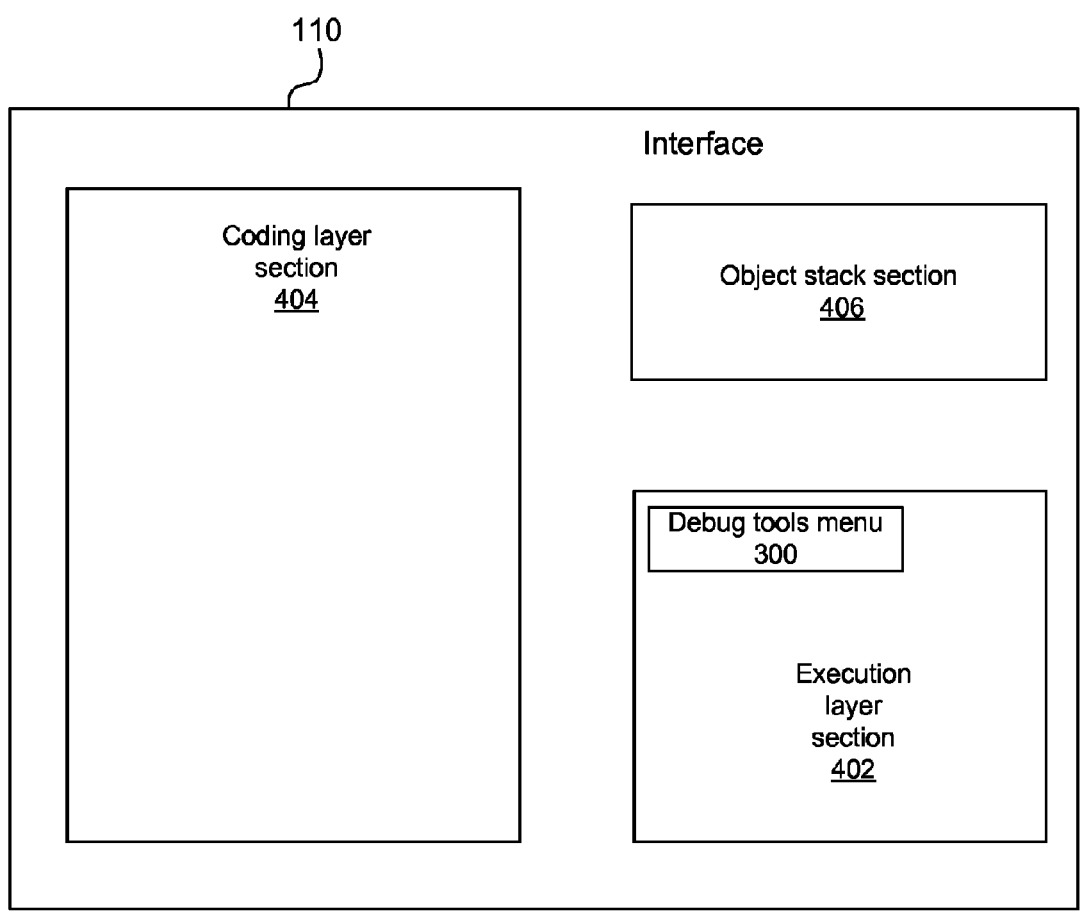
FIG. 4a depicts an example of an interface according to one embodiment.

Debug tools 300 may be provided in interface 110. FIG. 4a depicts an example of interface 110 according to one embodiment. Interface 110 includes an execution layer section 402, a coding layer section 404, and an object stack section 406.

Execution layer section 402 may display the execution plan in a hierarchical tree. An active block is also shown. Coding layer section 404 may show source code lines corresponding to the active block and possibly other blocks. Accordingly, the user may view both execution layer 106 and coding layer 104 in interface 110. Object stack section 406 also shows the current level in the object stack.

Figure 4B:
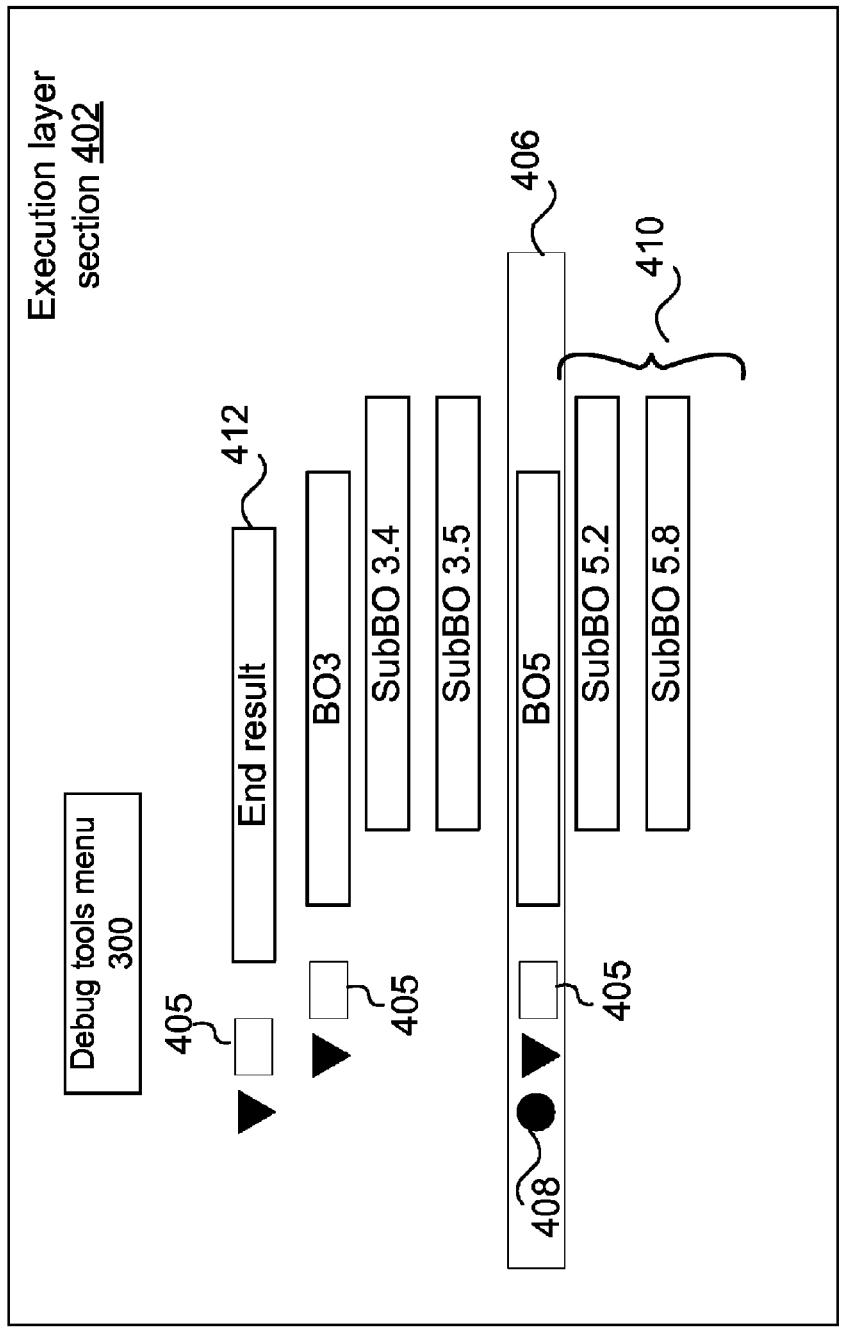
FIG. 4b shows a more detailed example of an execution layer section according to one embodiment.

FIG. 4b shows a more detailed example of execution layer section 402 according to one embodiment. The execution plan is defined by multiple folders 405 that represent blocks 202. For example, each line shown in execution layer section 402 may be a block 202. The hierarchical tree of the execution plan may be followed. For example, folders 405 may be traversed in execution. Although folders 405 are used, different methods of displaying the execution plan may also be used.

An active block 202 is shown at 406. This is the block in which execution is currently active. Thus, the support user can easily see which block 202 is currently active.

This may not have been obvious when looking at just source code in coding layer section 404. Additionally, a breakpoint in the execution plan is shown at 408.

A user may perform debug commands by selecting one of the commands shown in debug tools menu 300. The commands are then performed in one step at the block level.

Figure 4C:
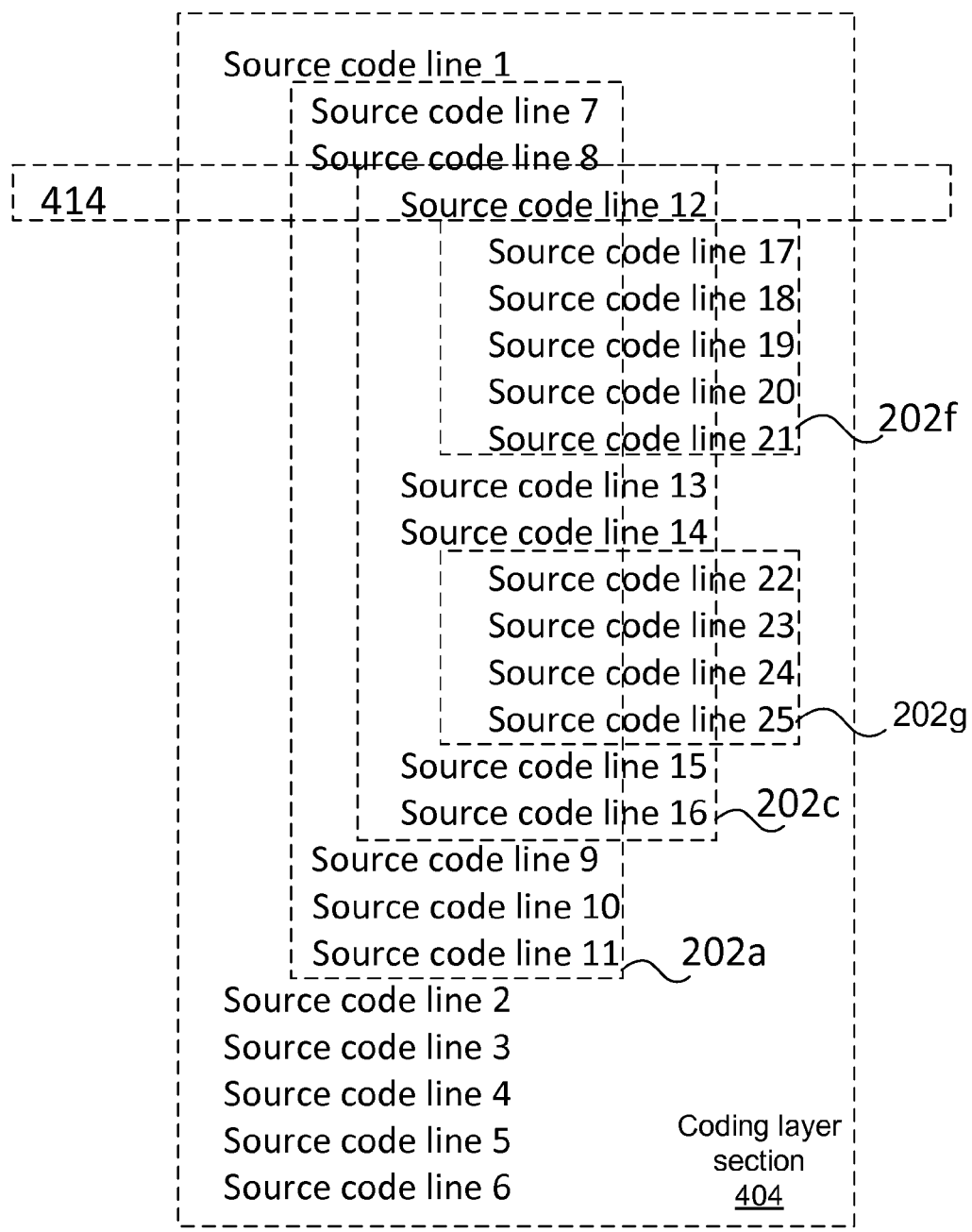
FIG. 4c shows a more detailed example of a coding layer section according to one embodiment.

FIG. 4c shows a more detailed example of coding layer section 404 according to one embodiment. Source code for blocks 202a, 202c, 202f, and 202g are shown. Applicants submit a person skilled in the art will appreciate the syntax of the source code and that coding layer section 404 represents a simplified version of the source code.

A current line of source code is highlighted at 414. As debug step function commands are selected in execution layer section 402, the current line of code may change as the focus of execution layer section 402 changes. For example, the current line of code tracks the execution at the block level.

Referring to both FIGS. 4b and 4c, in one example, if the step into command is performed, then debugger 102 moves into execution of the active block at 406. In this case, block 202f is entered into and the current line is line 17.

If the step out command is performed, then the active block is executed. Debugger 102 also moves the active block up a level in the object stack to a new active block. For example, debugger 102 moves the active block from block 202c to 202a. Also, the line of source code that is displayed is the next executable line in the new active block 202a, which may be source code line 9.

If the step over command is performed, then the active block is executed and any blocks in a sub-tree that need to be executed are executed. For example, block 202f is the next block and is executed. Then, debugger 102 stays in block 202c, but moves the active line of source code to source code line 13.

When the continue function is selected, then execution continues until a break point or end of file is found (not shown).

The block level actions may be performed using block information in the software application. The block information may identify blocks 202 in the software application according to the execution plan. Identifiers or other attributes for the block level may be inserted into the source code that are interpreted by debugger 102 when executing debugging tools 300. The block level action may be performed with reference to the block identifiers. This allows methods or functions for blocks 202 to be performed in one step. When actions at the block level are performed, debugger 102 uses the block information to execute the source code needed to perform the command.

Accordingly, particular embodiments provide many advantages. For example, faster browsing through blocks 202 is provided. The user may perform block level commands instead of moving line by line through source code. This allows for automatic changing of a semantic focus point during an arbitrary stop during execution of the software application. The semantic focus point is shown at the block level. Additionally, an execution plan may be defined that allows semantic driven breakpoints and blocks to be defined. Further, the blocks used in the execution plan during a debugging session may be saved and exported for other uses in a later session and to visualize the sequence outside of debugger 102.

Particular embodiments may be used in general purpose applications. These applications may have a complicated execution plan that is executed based on user requests. The execution of the execution plan depends on particular user requests received at run time. Logic in execution layer 106 is used to execute the user request. By providing an execution layer section 402 in debugger 102, the support user debugging the software application can better examine the behavior of the software application. Additionally, the support user is not forced to debug at the coding level but may debug at a higher semantic level.

In one example, the execution plan may make extensive use of a class (or many instances of a class). If a break point is set within the class, multiple stops at the coding layer occur at this break point if the code is being executed line by line. If the support expert is just looking at the source code, the context of which block 202 the source code has stopped at may be hard to determine. However, using execution layer section 402, the semantic focus of the application can be determined because the active block is displayed.

Figure 5:
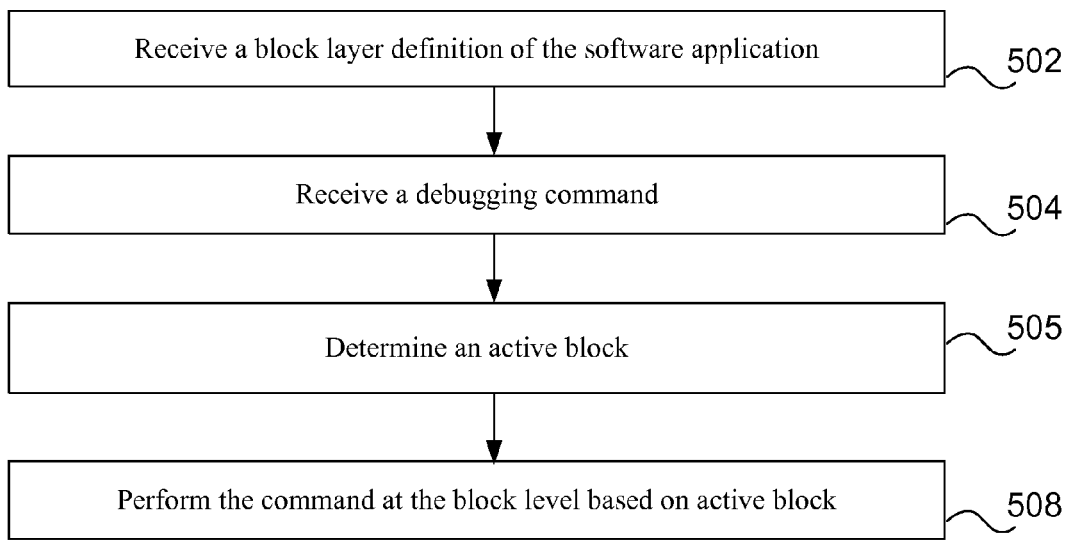
FIG. 5 depicts a simplified flowchart of a method for performing debugging according to one embodiment.

FIG. 5 depicts a simplified flowchart 500 of a method for performing debugging according to one embodiment. At 502, a block layer definition of the software application is received. The block layer definition may include an execution plan for the plurality of blocks 202 in the software application. In one example, the definition defines a hierarchy.

At 504, debugger 102 receives a debugging command. The debugging command may include one of the debugging tools described above.

At 506, debugger 102 determines an active block 202. The active block 202 is the block in which execution of the software application is being currently performed.

At 508, debugger 102 performs the command at the block level based on active block 202. The action may be one of the commands described above. The action is performed using the block layer definition. For example, the execution plan is used to perform the action at the block level.

Figure 6:
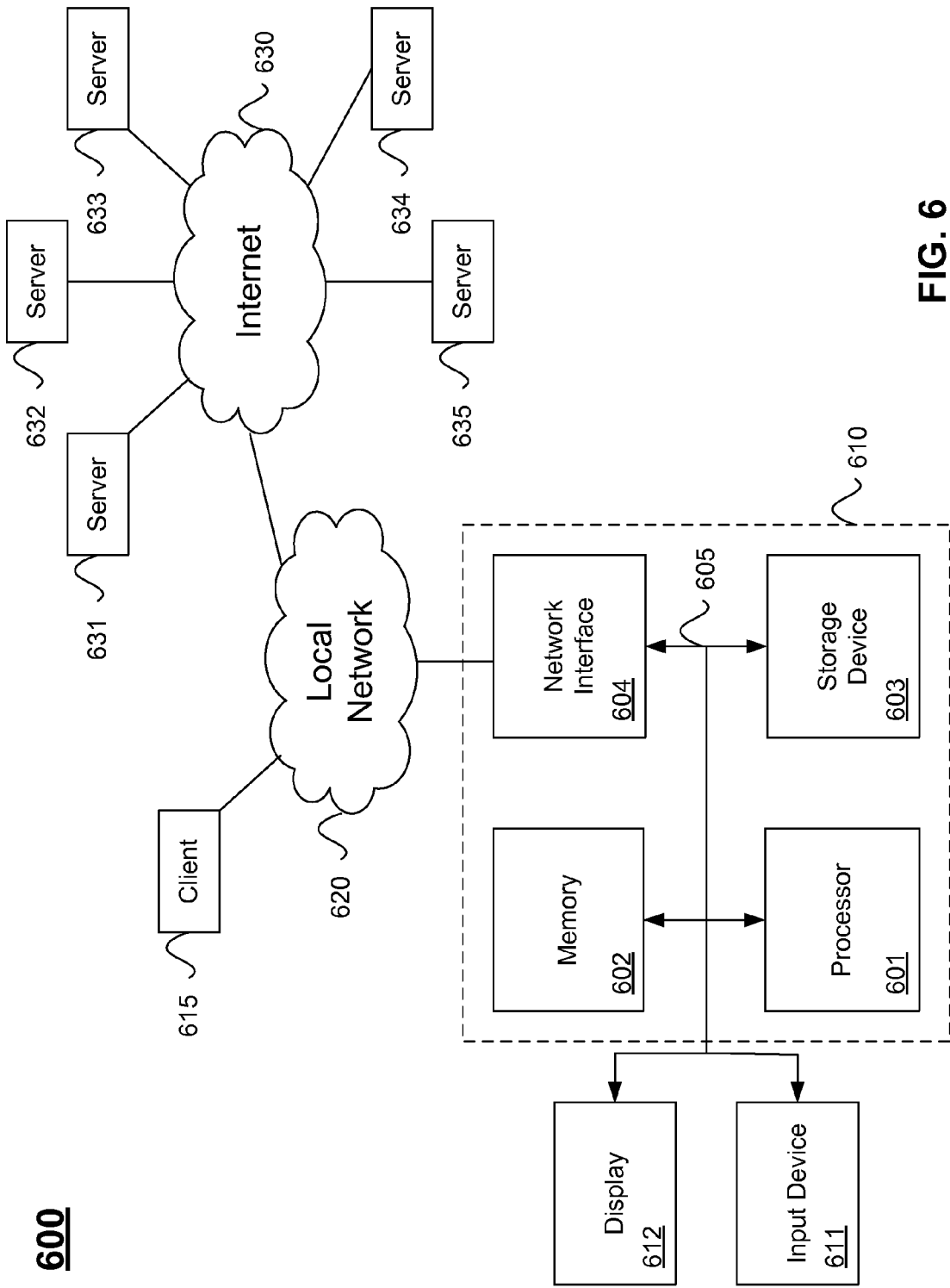
FIG. 6 illustrates hardware of a special purpose computing machine configured with the debugger according to one embodiment.

FIG. 6 illustrates hardware of a special purpose computing machine configured with debugger 102 according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   determining, by a computing device, an application including executable software;
   determining, by the computing device, an execution plan of a plurality of blocks in the application, the execution plan defining an execution order for execution of blocks in the plurality of blocks, wherein each block includes a set of executable software code in the executable software, and wherein different execution plans define different execution orders for execution of blocks in the plurality of blocks causing a different order of execution of the executable software code in the executable software;
   receiving, by the computing device, a block level debugging command in a debugger;
   in response to the block level debugging command, determining, by the computing device, an active block in the structure defined in the execution plan, wherein the active block includes a set of executable software code that defines a function of the active block; and
   in response to the block level debugging command, performing, by the computing device, a block level action on the active block, wherein the block level action executes the set of executable software code included in the active block.

2. The method of claim 1, wherein the block level debugging command comprises a step into command, wherein performing the block level action for the step into command comprises entering into execution of the set of executable software code included in the active block.

3. The method of claim 1, wherein the block level debugging command comprises a step over command, wherein performing the block level action for the step over command comprises:
   determining any subblocks to the active block in the execution order; and
   executing the set of executable software code included in the active block and any sets of executable software code included in any sub-blocks to move to a next block in the execution order.

4. The method of claim 1, wherein the block level debugging command comprises a step out command, wherein performing the block level action for the step out command comprises executing the set of executable software code included in the active block to move a next block in the execution order.

5. The method of claim 1, wherein the block level debugging command comprises a continue command, wherein performing the block level action for the continue command comprises executing executable software code included in the application until a block level break point is reached.

6. The method of claim 1, further comprising displaying a portion of the plurality of blocks in an interface, the portion organized in the execution order of the execution plan.

7. The method of claim 6, further comprising displaying corresponding sets of executable software code for the portion of the plurality of blocks.

8. The method of claim 7, wherein the portion of the plurality of blocks comprises the active block and the corresponding sets of executable software code comprise a current line of source code being executed for the active block.

9. The method of claim 1, wherein the block level action is performed using a block identifier for the active block.

10. The method of claim 1, wherein only a subset of the blocks in the plurality of blocks are needed for execution of the application.

11. The method of claim 1, wherein a calling sequence of a subset of the blocks in the plurality of blocks is determined at run-time of the application.

12. The method of claim 1, wherein the block level action is performed in one step in response to receiving the command.

13. The method of claim 1, further comprising:
receiving a coding level debugging command in a debugger;
in response to the coding level debugging command, performing, by the computing device, a line by line level action on the executable software code of the application.

14. A non-transitory computer-readable storage medium containing instructions that, when executed, control a computer system to be configured to:
determine an application including executable software;
determine an execution plan of a plurality of blocks in the application, the execution plan defining an execution order for execution of blocks in the plurality of blocks, wherein each block includes a set of executable software code in the executable software, and wherein different execution plans define different execution orders for execution of blocks in the plurality of blocks causing a different order of execution of the executable software code in the executable software;
receive a block level debugging command in a debugger;
in response to the block level debugging command, determine an active block in the structure defined in the execution plan, wherein the active block includes a set of executable software code that defines a function of the active block; and
in response to the block level debugging command, perform a block level action on the active block, wherein the block level action executes the set of executable software code included in the active block.

15. The non-transitory computer-readable storage medium of claim 14, wherein the block level debugging command comprises a step into command, wherein performing the block level action for the step into command comprises entering into execution of the set of executable software code included in the active block.

16. The non-transitory computer-readable storage medium of claim 14, wherein the block level debugging command comprises a step over command, wherein the computer system is configured to perform the block level action for the step over command by:
determining any subblocks to the active block in the execution order; and
executing the set of executable software code included in the active block and any sets of executable software code included in any sub-blocks to move to a next block in the execution order.

17. The non-transitory computer-readable storage medium of claim 14, wherein the block level debugging command comprises a step out command, wherein the computer system is configured to perform the block level action for the step out command by executing the set of executable software code included in the active block to move a next block in the execution order.

18. The non-transitory computer-readable storage medium of claim 14, wherein the block level debugging command comprises a continue command, wherein the computer system is configured to perform the block level action for the continue command by executing executable software code included in the application until a block level break point is reached.

19. The non-transitory computer-readable storage medium of claim 14, wherein the computer system is configured to display a portion of the plurality of blocks in an interface, the portion organized in the execution order of the execution plan.

20. The non-transitory computer-readable storage medium of claim 19, wherein the computer system is configured to display corresponding source code for the portion of the plurality of blocks.

21. An apparatus comprising:
one or more computer processors; and
a non-transitory computer-readable storage medium comprising instructions that, when executed, control the one or more processors to be configured to:
determine an application including executable software;
determine an execution plan of a plurality of blocks in the application, the execution plan defining an execution order for execution of blocks in the plurality of blocks, wherein each block includes a set of executable software code in the executable software, and wherein different execution plans define different execution orders for execution of blocks in the plurality of blocks causing a different order of execution of the executable software code in the executable software;
receive a block level debugging command in a debugger;
in response to the block level debugging command, determine an active block in the structure defined in the execution plan, wherein the active block includes a set of executable software code that defines a function of the active block; and
in response to the block level debugging command, perform a block level action on the active block, wherein the block level action executes the set of executable software code included in the active block.

* * * * *